(12) United States Patent
Demers et al.

(10) Patent No.: US 8,542,423 B2
(45) Date of Patent: Sep. 24, 2013

(54) STIFFNESS COMPENSATION IN OPTO-MECHANICAL MECHANISMS

(75) Inventors: Mathieu J. Demers, Quebec (CA); Jean-Thomas Landry, Quebec (CA); Henry L. Buijs, Quebec (CA)

(73) Assignee: ABB Inc., Saint-Laurent, Quebec (CA)

( * ) Notice: Subject to any disclaimer, the term of this patent is extended or adjusted under 35 U.S.C. 154(b) by 306 days.

(21) Appl. No.: 12/811,350

(22) PCT Filed: Jan. 8, 2009

(86) PCT No.: PCT/CA2009/000009
§ 371 (c)(1),
(2), (4) Date: Nov. 4, 2010

(87) PCT Pub. No.: WO2009/086625
PCT Pub. Date: Jul. 16, 2009

(65) Prior Publication Data
US 2011/0038021 A1    Feb. 17, 2011

Related U.S. Application Data

(60) Provisional application No. 61/019,743, filed on Jan. 8, 2008.

(51) Int. Cl.
*G02B 26/08*   (2006.01)
(52) U.S. Cl.
USPC ............................................... 359/200.7
(58) Field of Classification Search
USPC ............ 359/200.7, 223.1–226.1, 871, 872
See application file for complete search history.

(56) References Cited

U.S. PATENT DOCUMENTS

| | | | |
|---|---|---|---|
| 5,169,050 A | 12/1992 | Montagu | |
| 6,813,225 B2 | 11/2004 | Widdowson et al. | |
| 6,972,885 B2 * | 12/2005 | Hiley et al. | 359/225.1 |
| 7,013,057 B2 | 3/2006 | Osteerberg | |
| 2001/0011968 A1 | 8/2001 | Tidwell | |

FOREIGN PATENT DOCUMENTS

| | | |
|---|---|---|
| EP | 0143483 A1 | 6/1985 |
| EP | 1503246 A2 | 2/2005 |
| WO | 2009086625 A1 | 7/2009 |

OTHER PUBLICATIONS

Quertemont, Eric, Supplementary European Search Report, EP09700712, The Hague, Oct. 27, 2011.

* cited by examiner

*Primary Examiner* — Euncha Cherry
(74) *Attorney, Agent, or Firm* — Michael M. Rickin

(57) ABSTRACT

An optical scanning or positioning mechanism has a head on which optical components are mounted and an actuator coupled to the head to cause the head to move when the actuator is actuated. There are one or more sets of flexure bearings mounted in the mechanism. The flexure bearings have a restoring torque when moved from a rest position. The bearings are coupled to the head to allow the head to move when actuated by the actuator. One or more magnets are mounted in the mechanism in a location other than in the actuator to compensate for the flexure bearings restoring torque.

8 Claims, 21 Drawing Sheets

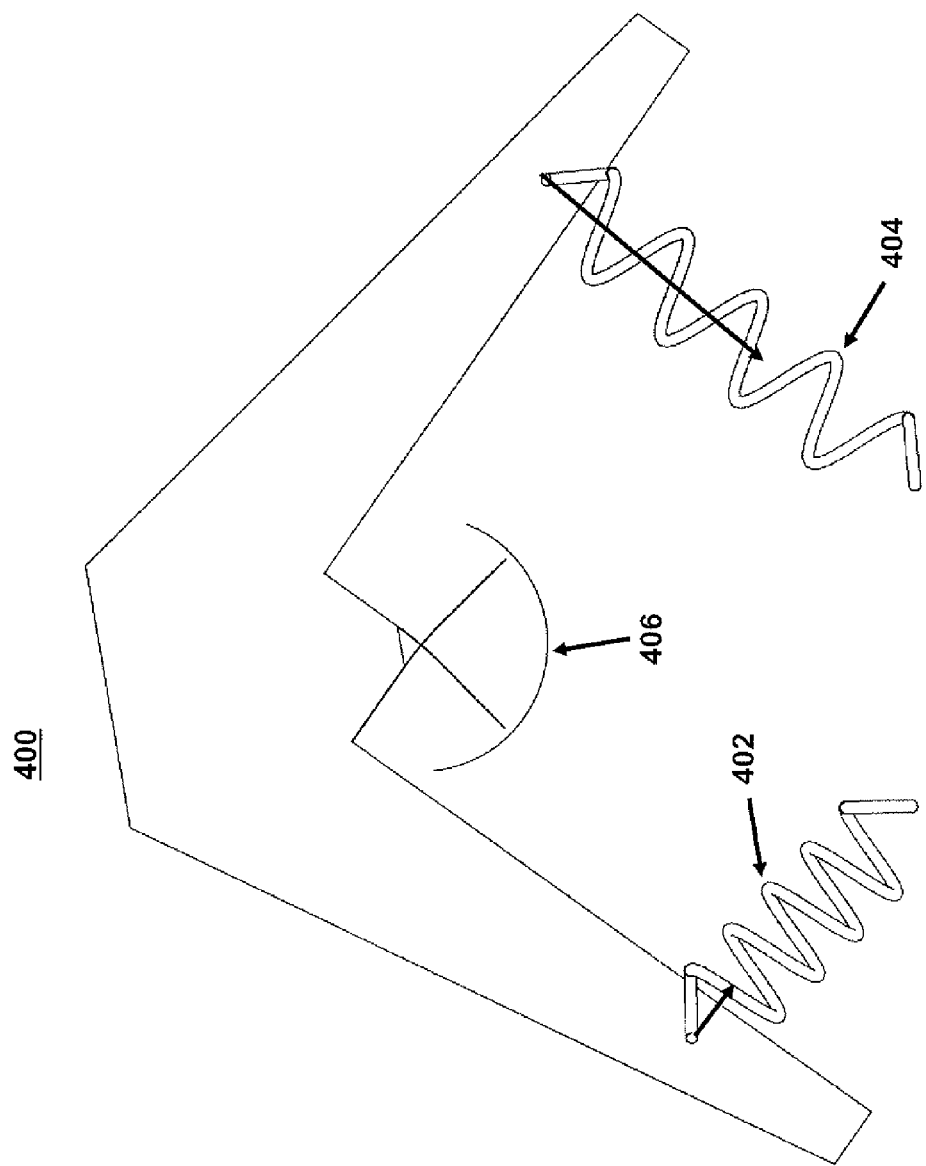

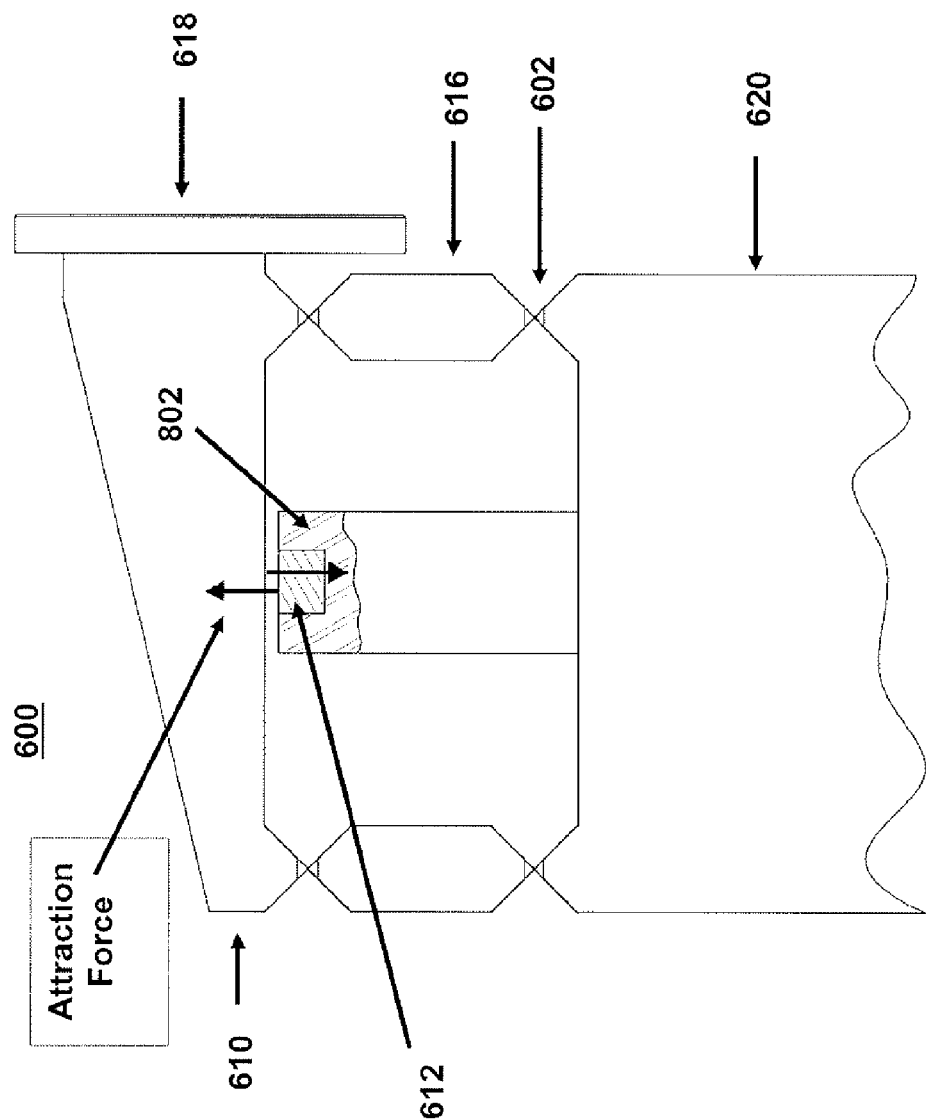

STIFFNESS COMPENSATION IN OPTO-MECHANICAL MECHANISMS

1. Field of the Invention

The present invention relates to opto-mechanical assemblies providing for translational or rotational movement or positioning of optical element(s) with respect to an axis governed by flexure bearings or blades or integral flexures (all of which are referred to hereinafter as "flexure bearings" solely for ease of description and not as a limitation on the scope of the present invention) and more particularly to the compensation of the restoring torque of the flexure bearings.

2. Description of the Prior Art

Flexure bearings employed for partial rotation about a pivot point have several advantages over other types of bearings. Flexure bearings have no backlash and hence ensure precise repeatable motion. Flexure bearings do not have friction and do not require lubrication. The operational life of flexure bearings can be indefinitely long when stresses in the flexure bearing blades are limited to below the endurance stress of the bearing material. These properties make this kind of bearing the best choice for opto-mechanical assemblies employed in satellite systems, systems requiring very high reliability, systems operating in high vacuum or a monitored environment.

As is well known, flexure bearings have a restoring force or restoring torque that tends to return any flexure bearing mounted assembly such as an opto-mechanical assembly to its nominal or rest position. The restoring force or torque is a function of the flexure bearing rigidity, that is bearing stiffness, required for the application. Opto-mechanical flexure bearing mounted assemblies may require high stiffness of the flexures in order to resist severe survival conditions like vibrations and shocks and/or maintain acceptable performance during usage under relatively severe conditions. Thus the disadvantage of using flexure bearings for such assemblies is that increased force is required to maintain the angular position of the opto-mechanical assembly as the angle of rotation of the bearings is increased with respect to their rest position.

On the other hand, limited angle scanning mechanisms, like those using bearings with a restoring torque, typically have a constant velocity during the instrument's acquisition period. Because successive scans are opposite in direction, they are separated by a relatively short period during which the mechanism is decelerated and accelerated in the opposite direction. This portion of the stroke is referred to as turnaround. It is thus an advantage at the turnaround of scanning mechanisms, to have a restoring force since it is oriented in the same direction as the required turnaround force (mechanism inertia X required acceleration) and therefore eases the turnaround.

In most cases, these opto-mechanical systems are moved or positioned by linear or rotary actuators. The actuators must provide a force to accelerate the motion of the opto-mechanical assembly. Further the actuators must also provide a force to overcome the flexure bearing restoring force or restoring torque and this additional force is wasteful. By compensating for the restoring force or restoring torque in accordance with the present invention, the actuator force and consequently size and power consumption can be minimized independently of stiffness.

However, one disadvantage of compensating for the restoring torque is that it eliminates the inherent advantage of the restoring torque to ease turnaround in scanning mechanisms. But since, in most applications, the required turnaround force is lower than the restoring force and its period of time is shorter, it is preferable to compensate for the highest of the two forces encountered, that is the restoring force/torque. This exposure reduces both the peak actuator force and total power consumption.

Many factors may limit power consumption. Examples of such factors are concern for the environment or indirectly Energy Star certification, battery capacity in satellite systems, and restrained operational temperatures to which power dissipation and thus consumption is an obstacle.

Michelson interferometers, which may also be referred to as two-beam interferometers, are one example of an opto-mechanical assembly that may comprise one (1) or more flexure bearings. A Michelson interferometer is a unit that splits a beam of light (ultra-violet, visible and/or infrared) in two, commonly by means of a semi-transparent substrate. A mechanism after the splitting creates a differential in the two (2) light paths lengths while reflecting them back to the semi-transparent substrate where the two (2) beams are recombined. The new beam is then brought out of the interferometer, commonly through optics and onto a detector where the interference is monitored.

The principle of force compensation for flexure bearings has been illustrated in an article entitled *Flexible Bearings For High-Precision Mechanisms in Accelerator Facilities* published by Le Centre Suisse d'Electronique et de Microtechnique (CSEM) [S. Henein, I. Kjelberg, and S. Zelenika, "Flexible bearings for high precision positioning and stabilization". 26th Advanced ICFA Beam Dynamics Workshop on Nanometer Size Colliding Beams—Nanobeam 2002, 2-6 Sep 2002, Lausanne, Switzerland, Assmann, A (ed.); Zimmermann, Frank (ed.) 2002 Geneva: CERN-301 p]. The CSEM article describes a system that provides a compensation force to a translational mechanism in a direction that is different from the restoring force of the flexures. FIG. 1 herein, which is FIG. 8 of the CSEM Article, shows the test set-up 100 used by the authors of the CSEM Article to illustrate the compensation principle. By buckling the flexures 102, a part of the force supplied by the spring 104 serves against the restoring force, therefore compensating it.

In FIG. 2 there is shown a method of torque compensation for an opto-mechanical scanning/positioning system 200 in which the compensation force, provided by the extension spring 202, is applied to the mobile component 204 and oriented through the axis of a flexure bearing 206 so that it does not provide any torque while the system is at rest position. When the system is given a position other than rest, a lever length appears between the compensation force and the pivot axis, and because the spring 202 tends to shorten, the compensation force 210 begins to act as a torque against the clockwise restoring torque 208.

Although the goal of compensating for the restoring torque 208 may be reached by the mechanism shown in FIGS. 1 and 2, one side effect of such an arrangement is a need for a relatively high compensation force 312 (see FIG. 3) of which only a small part, the tangential component 308 as shown in FIG. 3, acts directly against the restoring torque 306. The remainder, that is, the radial component 310, which is the larger component of the compensation force 312, adds an amount of useless stress in the flexures 304 that may reduce their performance and/or lifetime.

Therefore the use of the compensating mechanism shown in FIGS. 1 and 2 may require additional stiffness to support the high radial force. This in turn increases the positive spring constant of the flexure bearing and thus the required compensation force, and so on, unless a compromise between reliability and power economy is accepted.

Another side effect of the use of spring(s) as shown in FIGS. 1 and 2 is that, because of their high flexibility, extension and compression springs and spring blades arrangements have various natural vibration frequencies and relatively high amplitude that may be called parasitic frequencies. Systems operating under vibration or scanning at frequencies close to these natural vibration frequencies may therefore see their position, velocity and/or acceleration affected by the induced parasitic frequencies.

As can be appreciated from the above description, the perpendicular spring compensation as shown in FIG. 2 is not practical when it is desired to compensate for most if not all of the restoring torque 208. Therefore, the compensation force should be applied tangentially to the angular stroke of the flexure bearings 206 in FIG. 2 and 304 in FIG. 3, resulting in an almost pure torque that barely stresses the flexures.

As described above, there are many low power consumption applications for using opto-mechanical assemblies comprising flexure bearing(s) such as environment friendly systems, satellite systems and restrained operational temperature systems. Therefore, it is desirable to compensate for the restoring torque of the flexure bearing without increasing the power consumption.

FIG. 4 shows a flexure bearing 400 with linear springs 402 and 404 with spring 402 shown minimally extended and spring 404 shown extended. Because of their positive spring constant, linear springs (as shown in FIG. 4) or flexures cannot act tangentially and opposed to the clockwise restoring torque/force 406 of the flexures constraining the stroke. An arrangement of the kind shown in FIG. 4 would increase the effective stiffness of the system instead of decreasing it.

Therefore in theory, tangential torque/force compensation requires a negative spring constant, so that a diminution of the length of the "spring" increases the force generated by it to thereby minimize the effective restoring torque/force.

The prior art teaches several different ways to approximate a practical negative spring constant.

The article entitled *Plate Spring Mechanism With Constant Negative Stiffness* published by J. Van Eijk and J. F. Dijksman in association with the University of Columbo, Sri Lanka and the Delft University of Technology, The Netherlands "Mechanism and Machine Theory Vol. 14, pp. 1-9". Pergamon Press Ltd., 1979 and the article entitled *The Deep Fall Back Solution. Passive External Pre Isolation and Stack Damping for LIGO* published by The California Institute of Technology and the Massachusetts Institute of Technology [Bertolini, DeSalvo, Fidecaro, Mantovani, Marka, Sannibale, Simonetti, Takamori & Tariq] DCC Number LIGO-T040197-00-R, Nov. 14$^{th}$, 2003, each teach a similar way to use spring blades to generate near to zero-stiffness motion using what the literature refers to as "instability". Their common combination of constantly buckled spring blades generates a negative spring constant which, coupled with a positive spring constant arrangement of spring blades or a compression spring, results in a zero-stiffness flexure bearing based motion.

However, the mechanisms described in the above two articles have an obvious resemblance to the mechanism described in the CSEM Article and thus have the same flaw described above related to compression and extension and spring blades, namely, they both introduce low parasitic vibration frequencies with relatively high amplitude.

U.S. Pat. No. 5,169,050 entitled Wire Bonder With Improved Actuator ("the '050 patent") describes the use of a magnetic field instead of buckled spring plates to approximate a negative spring constant. FIG. 11 herein, which is FIG. 1 of the '050 patent, shows a mechanism rotating around flexure bearing 16 with respect to the base assembled from components 12 and 14. The wire bonder uses an actuator to cause pivoting about the pivot axis and thus raise and lower the wire bonding head 20. Embedded in the actuator are a cylindrical iron sleeve 46 and a permanent magnet 56. As the mechanism is brought further from its rest position and hence experiences higher restoring torque due to the flexure bearing, the gap between magnet 56 and sleeve 46 diminishes on one side with respect to the gap on the other side, causing the components to attract each other and thereby compensating in part or in whole for the restoring torque.

This mechanism compensates for the restoring torque without affecting the reliability of the flexure bearing and does not introduce additional parasitic vibrations modes. On the other hand, the mechanism adds several constraints to the design as it imposes a relatively long arm that ensures a sufficient gap variation between magnet 56 and sleeve 46. Having the permanent magnet 56 tilted with respect to the iron sleeve 46 also causes the magnetic field to be weaker, hence a reduced effectiveness. This restoring torque compensating mechanism is part of the actuating mechanism, that is, the same magnet 56 is used for both restoring torque compensation and movement of the actuator. This dual use of the magnet 56 makes the design of the restoring torque mechanism inflexible as the magnet 56 that gives rise to the compensation must be located in the actuator. Further the actuator needs a certain size magnet to function as an actuator. Also this restoring torque mechanism can only be used to compensate for the restoring torque arising from a rotational movement of a flexure bearing.

The present invention as is described below provides a more effective and more flexible method and apparatus for approximating a negative spring constant to thereby compensate for the restoring torque of a flexure bearing without increasing the power consumption and without inducing parasitic vibration frequencies and for some applications does supply a tangential compensation force that does not stress and/or deform the flexural pivots.

SUMMARY OF THE INVENTION

An optical scanning or positioning mechanism has:
a head having optical components mounted thereon;
an actuator coupled to the head to cause the head to move when the actuator is actuated;
one or more sets of flexure bearings mounted in the mechanism and coupled to the head to allow the head when actuated by the actuator to move, the one or more flexure bearings having a restoring torque when moved from a rest position; and
one or more permanent magnets mounted in the mechanism in a location other than in the actuator to compensate for the flexure bearings restoring torque.

In an optical scanning mechanism having a head with optical components mounted thereon, an actuator coupled to the head to cause the head to move when the actuator is actuated, one or more sets of flexure bearings mounted in the mechanism and coupled to the head to allow the head when actuated by the actuator to move, the one or more sets of flexure bearings having a restoring torque when moved from a rest position, a method for providing compensation for the restoring torque of the one or more flexure bearings. The method includes:
mounting one or more permanent magnets in the mechanism in a location other than in the actuator to compensate for the flexure bearings restoring torque.

A method for making an optical scanning mechanism having a head having optical components mounted thereon. The method includes:

coupling an actuator to the head to cause the head to move when the actuator is actuated;

providing one or more sets of flexure bearings mounted in the mechanism and coupled to the head to allow the head when actuated by the actuator to move, the one or more flexure bearings each having a restoring torque when moved from a rest position; and mounting one or more permanent magnets in the mechanism in a location other than in the actuator to compensate for the flexure bearings restoring torque.

In an optical scanning mechanism having a head with optical components mounted thereon, an actuator coupled to the head to cause the head to move when the actuator is actuated, one or more sets of flexure bearings mounted in the mechanism and coupled to the head to allow the head when actuated by the actuator to move, the one or more flexure bearings having a restoring torque when moved from a rest position, a method for compensating for the restoring torque of the one or more flexure bearings. The method includes:

using the magnetic field of one or more permanent magnets mounted in the mechanism in a location other than in the actuator to provide a force to compensate for the restoring torque of the one or more flexure bearings.

DESCRIPTION OF THE DRAWING

FIG. 4 shows a flexure bearing with linear springs.

FIGS. 7 and 8 show alternate embodiments for a translational scanning mechanism which has compensation of a flexure bearing restoring torque by the diminishing of the gap in a permanent magnet-iron circuit.

DETAILED DESCRIPTION

Figure 1:
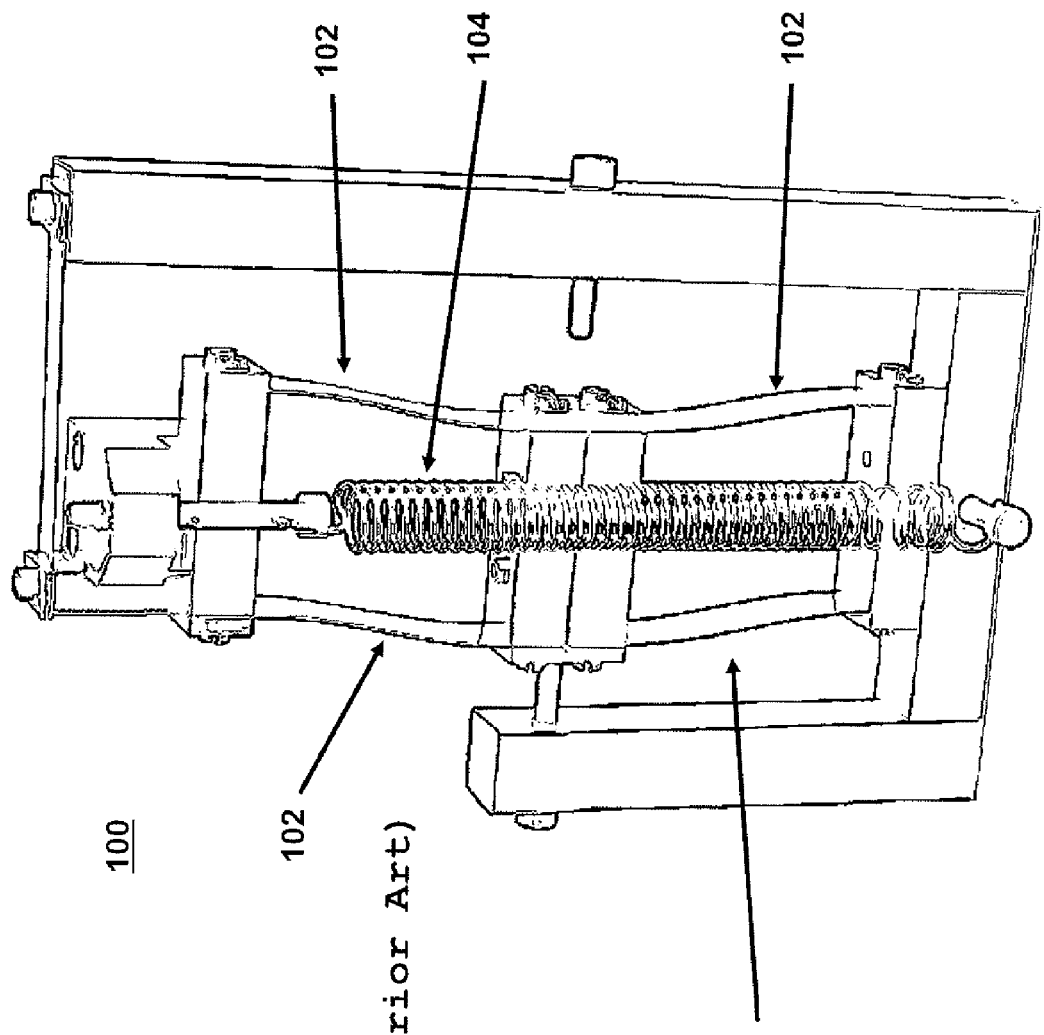
FIG. 1 shows a prior art mechanism that is used to illustrate the principle of force compensation for flexure bearings.

As is described above, the present invention approximates a negative spring constant. The negative spring constant is approximated with the partial closing of an air gap in a permanent magnet-iron magnetic circuit as shown in the different embodiments of FIGS. 5, 6, 7, 8 and 9.

FIGS. 5a to 5e each show without limitation an example of an embodiment for the two (2) magnet circuits 500 where the same reference numeral identifies the same element in all of the figures. Thus reference numerals 502 and 504 which appear in all of the figures identify a first ferromagnetic base and a permanent magnet respectively. Reference numeral 506 which appears only in FIG. 5c identifies a second ferromagnetic base.

Figure 5A:
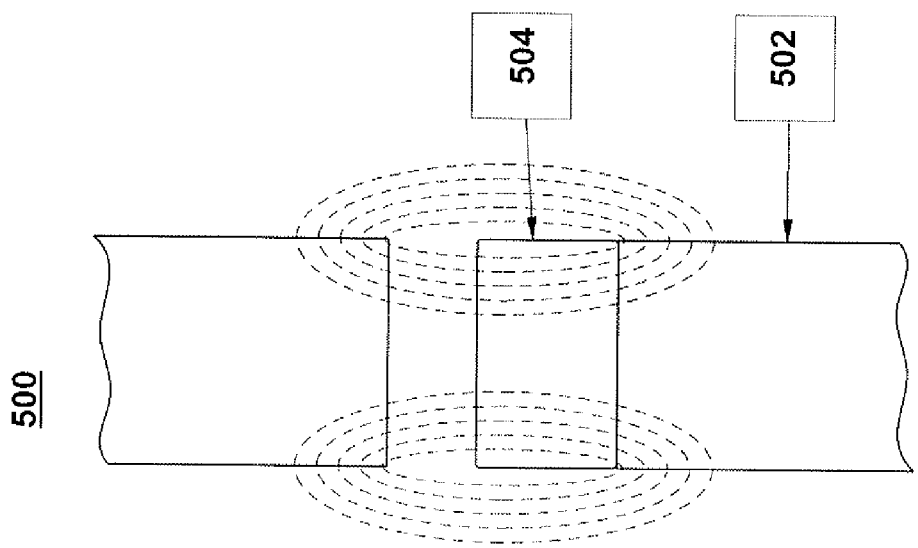
FIGS. 5a to 5e each show an example of an embodiment for the two (2) magnet circuits can be used to provide the compensation of the present invention.
Figure 5B:
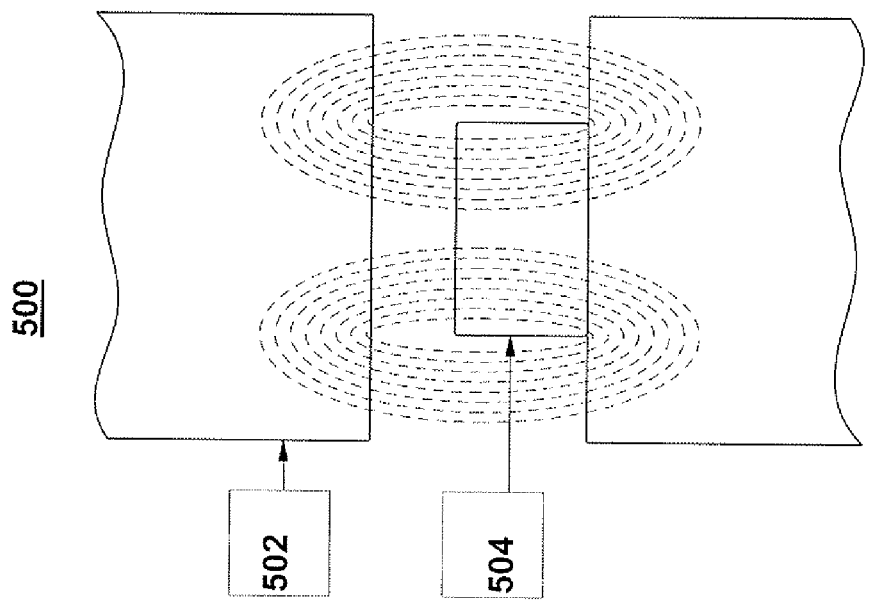
Figure 5C:
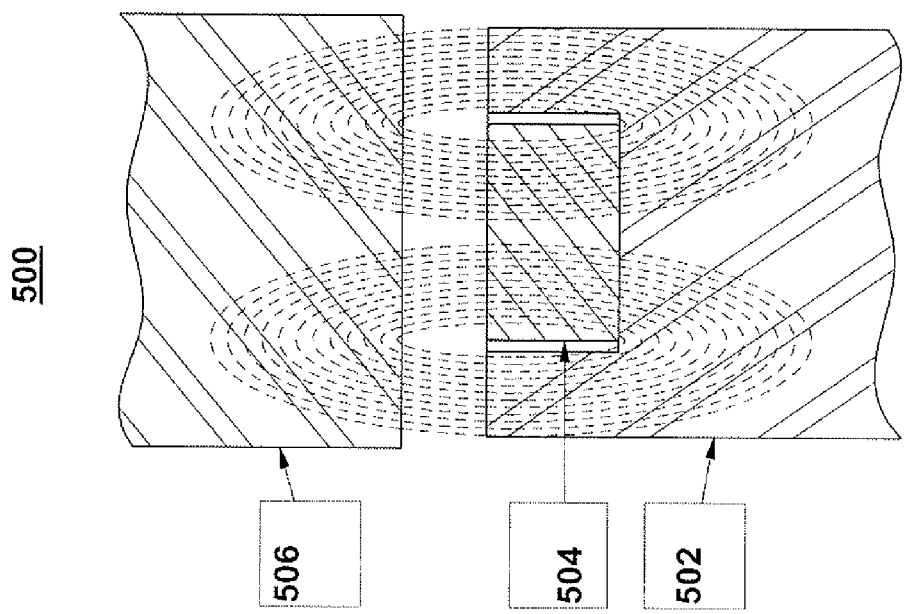
Figure 5D:
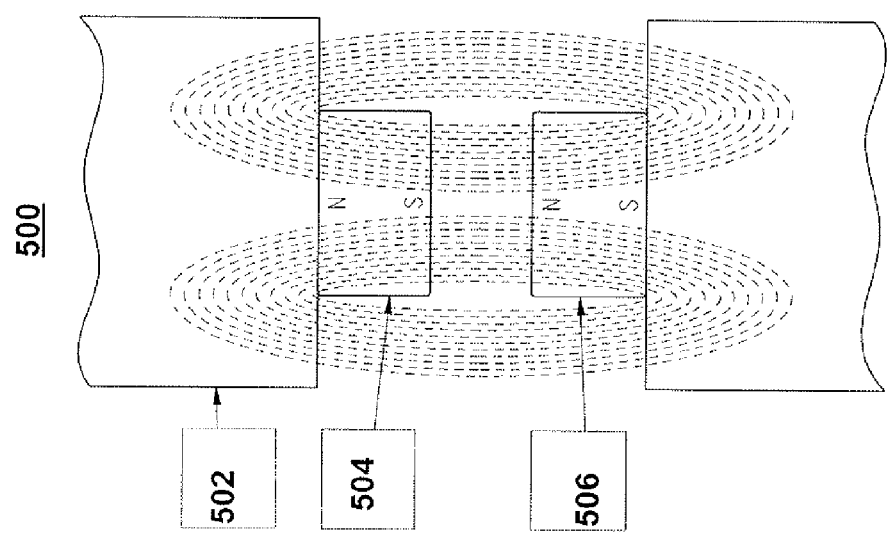
Figure 5E:
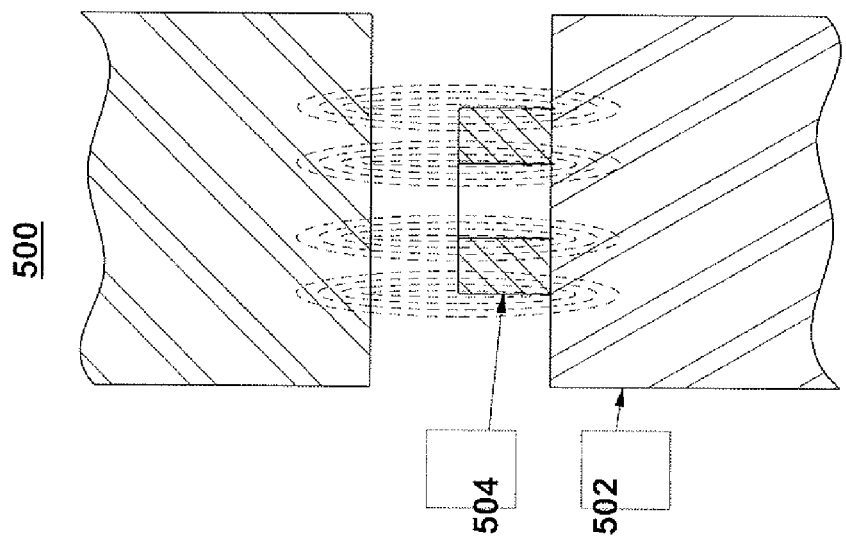

FIG. 5a shows a single magnet configuration. FIG. 5b shows an extended single magnet configuration. FIG. 5c shows in a sectional view a closed loop single magnet configuration. FIG. 5d shows a double magnet configuration. FIG. 5e shows in a sectional view a single ring shaped magnet configuration. The choice of one configuration rather than another may depend on the amount of compensation force needed, mass requirements, space available for the compensation elements, etc.

In FIGS. 5a to 5e, the magnet circuits are shown positioned in the rest position so that the gaps for both circuits of the embodiment are equal in that position. In this way no net compensating force is applied at the rest position. At a position other than rest, the two gaps are unequal such that the net magnetic force compensates for the restoring force.

Figure 6A:
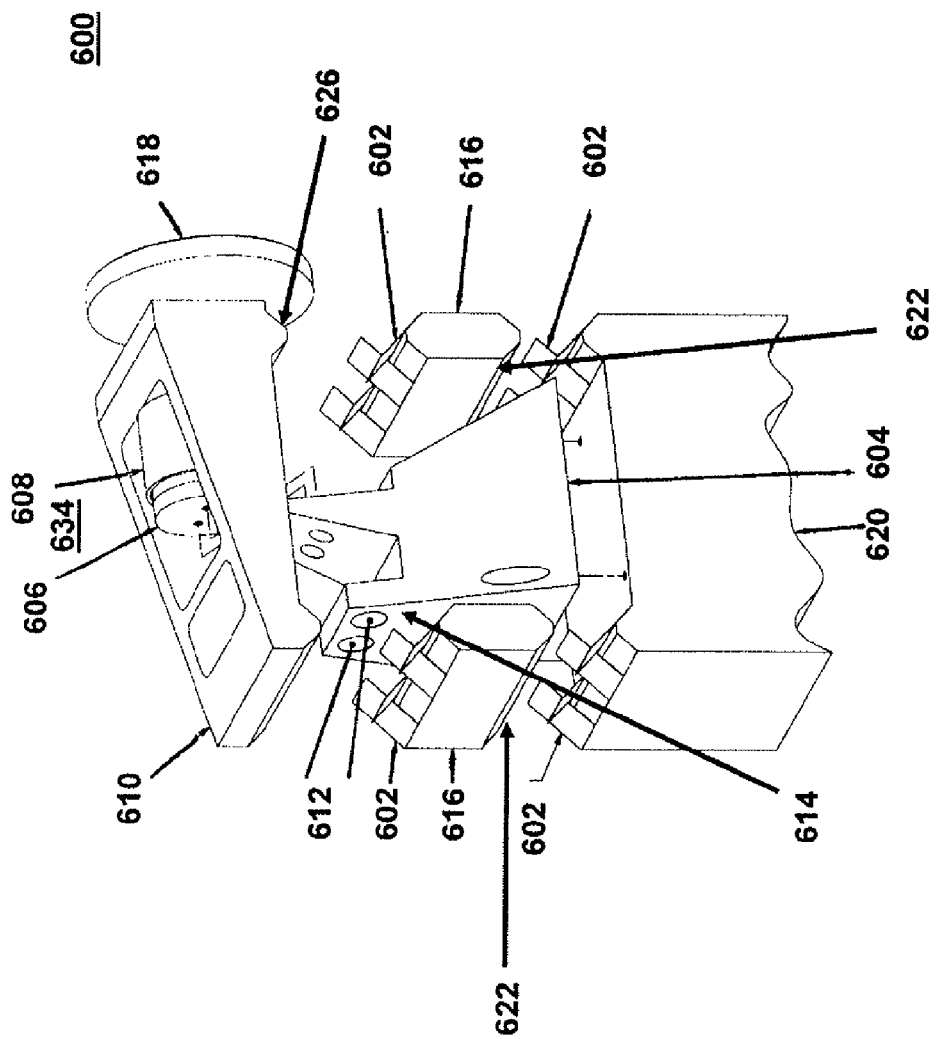
FIGS. 6a to 6c show three views of one embodiment for an optical translational scanning mechanism for use in a two beam interferometer that includes the flexure bearing restoring torque compensation of the present invention.
Figure 6B:
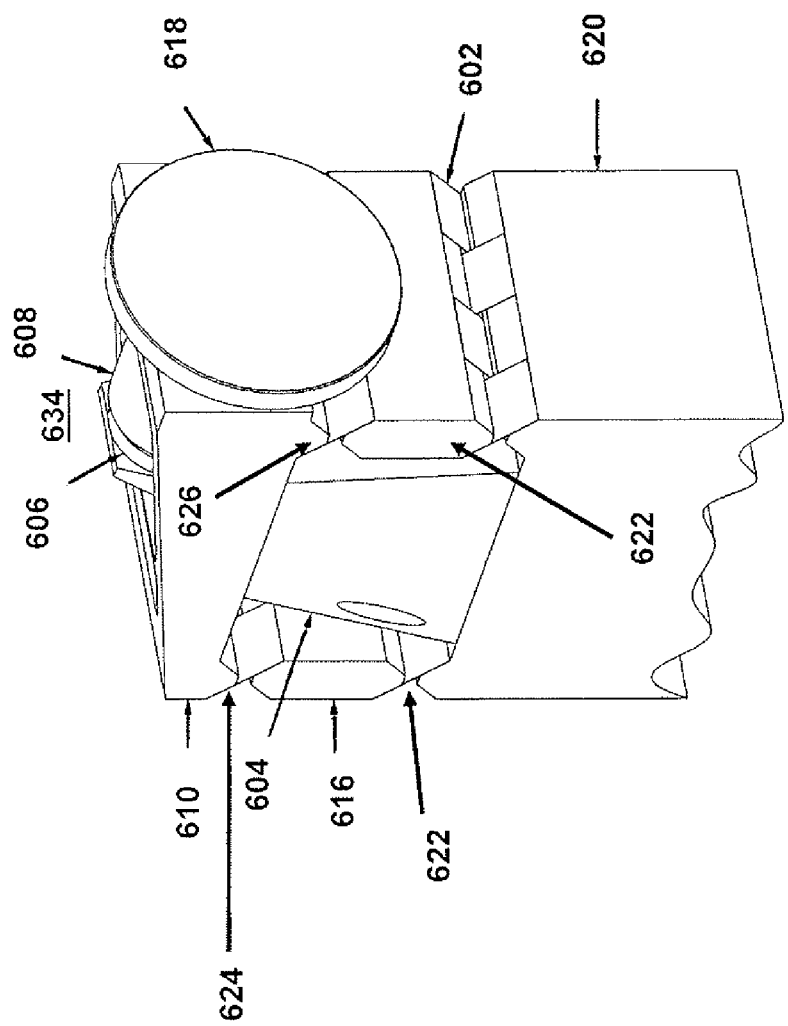
Figure 6C:
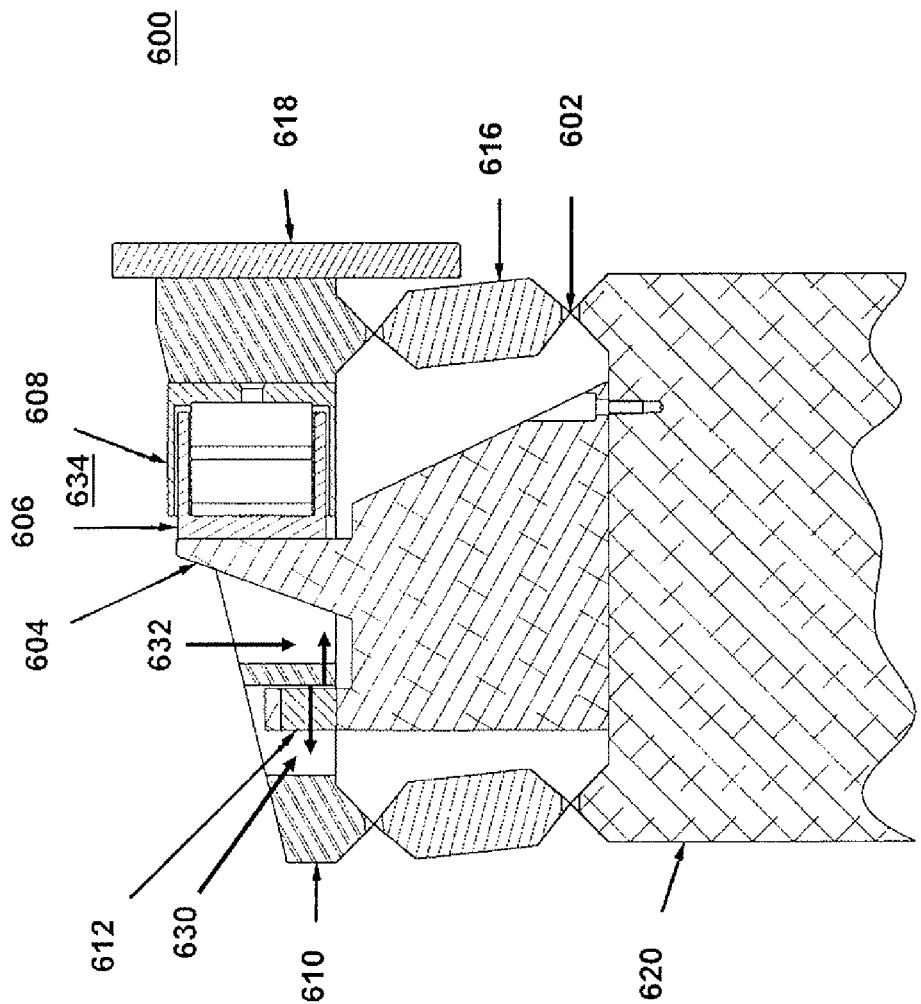

Referring now to FIGS. 6a to 6c, there are shown three views of one embodiment for an optical translational scanning mechanism 600 for use in a two beam interferometer that includes the flexure bearing restoring torque compensation of the present invention. As shown in FIGS. 6a to 6c, mechanism 600 includes four sets of flexure bearings 602.

Figure 10:
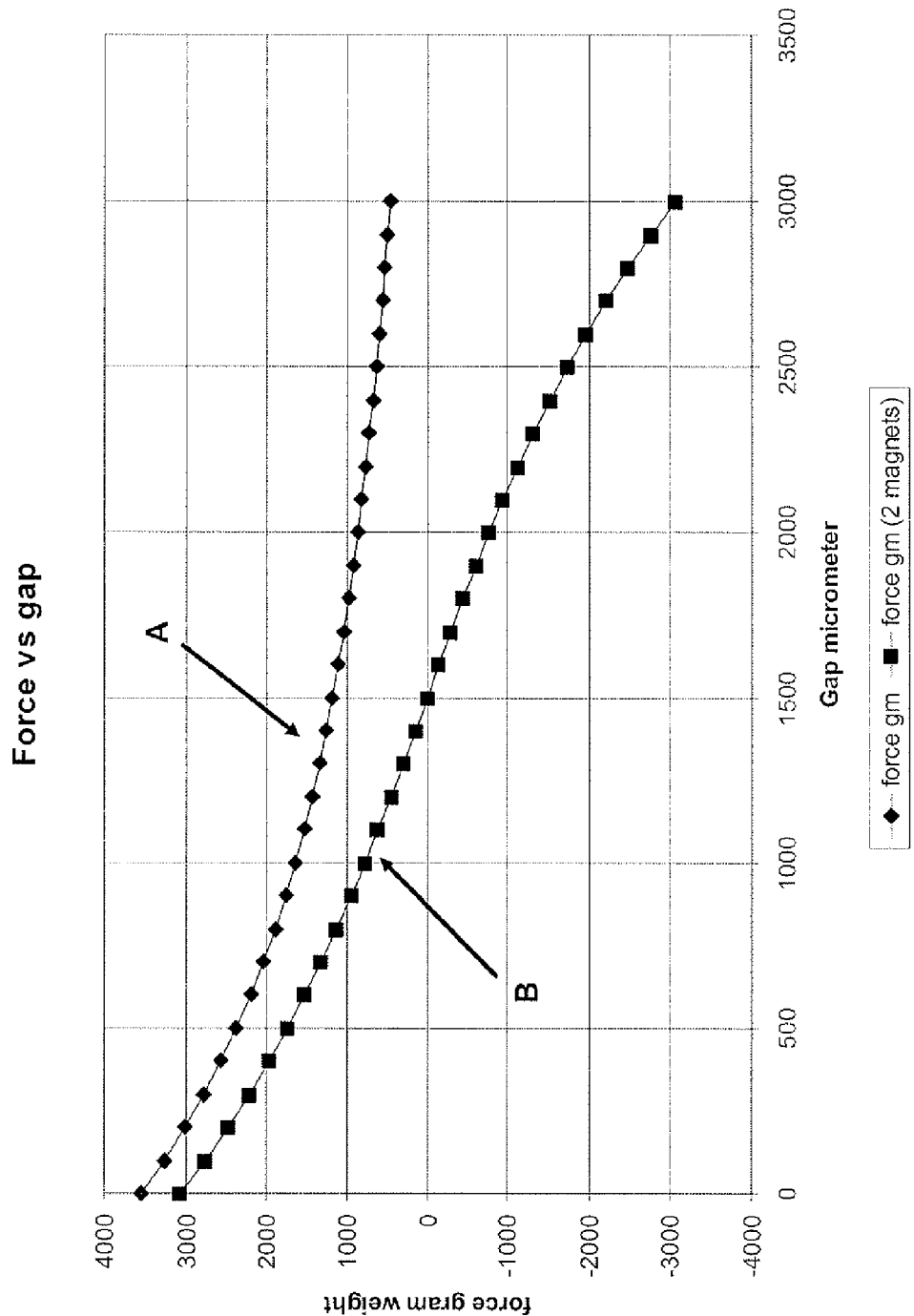
FIG. 10 shows the relationship between magnet gap and attractive force in a magnetic circuit that comprises permanent(s) magnet(s) and a ferromagnetic part.
Figure 11:
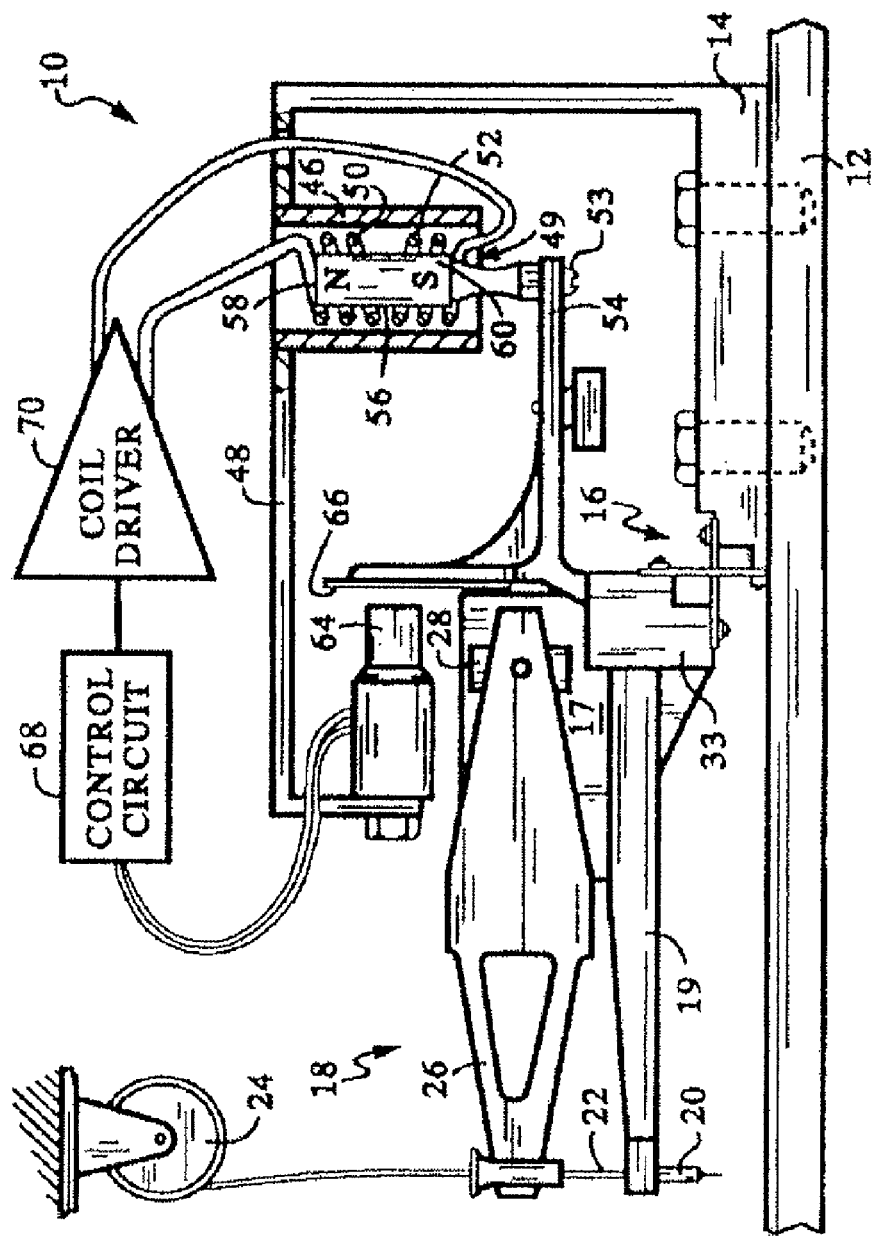
FIG. 11 shows a prior art mechanism that has an actuator that provides from the actuator magnet compensation for the restoring torque of the flexure bearing used in the mechanism.

Mechanism 600 further includes a coil mount 604 on which is mounted the coil sub-assembly 606 of a linear voice coil actuator 634, while the magnet sub-assembly 608 of the voice coil actuator 634 is attached to a linkage 610. Mechanism 600 further includes first and second permanent magnets 612, each of which are in an associated hole through an upwardly projecting wall 614 in coil mount 604, and first and second pivot arms 616. This arrangement of permanent magnets 612 is a two-gap configuration which as explained below in connection with the curves shown in FIG. 10 gives a substantially linear force versus gap distance.

Mechanism 600 also further includes a flat mirror 618 and a frame 620 to which, as is shown in FIGS. 6b and 6c, coil mount 604 is mounted when the mechanism 600 is assembled. The actuator 634 that is comprised of sub-assemblies 606 and 608 drives the scanning of the interferometer. Thus mechanism 600 is a pivot parallelogram and is an example of an opto-mechanical scanning mechanism that provides translation to mirror 618. The four sets of flexure blades 602 provide rotation to the two parallel pivot arms 616 and two dimensional translation to linkage 610 on which mirror 618 is mounted with respect to the fixed frame 620.

FIG. 6a shows a left side and rear exploded perspective of mechanism 600 with the coil mount 604 raised above frame 620 and the linkage 610 raised above the coil mount 604 to more clearly show the flexure bearings 602. As is shown in FIG. 6a, the first and second pivot arms 616 each have a lower edge 622 that is engaged with the associated one of the lower flexure bearings 602 when mechanism 600 is assembled. Also as is shown in FIG. 6a, the linkage 610 has at opposite ends lower edges 624 and 626 that are engaged with the associated one of the two upper flexure bearings 602 when mechanism 600 is assembled.

FIG. 6b shows a front and left side view of the assembled mechanism 600 in a rest position and FIG. 6c shows a left side section of the assembled mechanism 600 in a non rest position. The engagement of the lower edge 622 of each of the first and second pivot arms 616 and the engagement of the lower edges 624 and 626 of the linkage 610 with the associated flexure bearing 602 when mechanism 600 is assembled is shown in FIGS. 6b and 6c.

The scanning of the interferometer results in a restoring torque in each of the flexure bearings 602. For example, the actuator 634, has as shown in FIG. 6c, caused the upper part of mechanism 600 to move to the rear as compared to the rest position thereby flexing the flexure bearings 602. This gives rise to a restoring torque which is not shown in FIG. 6 but is shown FIG. 7 by the arrows 628. The attraction force provided by magnets 612 that compensates for the restoring torque is shown in FIG. 6c by the arrows 630 and 632. As can be appreciated from the above description, the use of the permanent magnets 612 in translational mechanism 600 of FIGS. 6a to 6c provides torque compensation by diminishing the air gap in the permanent magnet-iron circuit. It should be appreciated that in the embodiment shown in FIGS. 6a to 6c, the permanent magnets 612 that provide the attraction force to compensate for the restoring torque are separate from the magnet sub-assembly 608 of the voice coil actuator.

Figure 7:
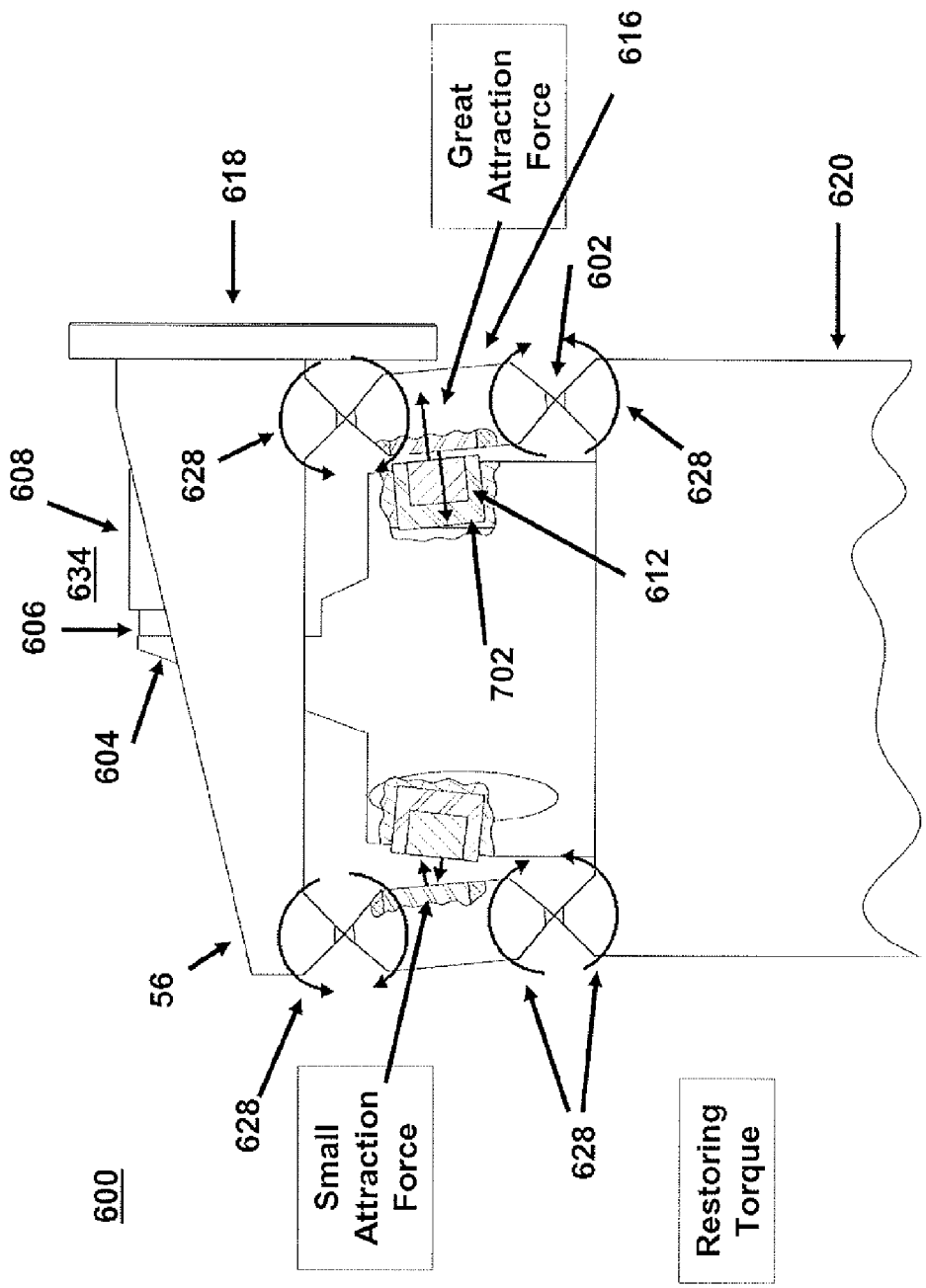

FIGS. 7 and 8 show alternate embodiments for a translational scanning mechanism 600 that compensates for a flexure bearing restoring torque by the diminishing of the gap in a permanent magnet-iron circuit. Those elements shown in FIGS. 7 and 8 that are identical in function with the elements shown in FIGS. 6a to 6c have the same reference numeral as used in those figures.

The embodiment shown in FIG. 7 is also a two-gap configuration. As mirror 618 and its mounting structure are actuated back and forth by the actuator 634, the pivot arms 616 are rotated and one pivot arm is brought closer to a magnet or magnet arrangement 612 while the other pivot arm is brought further away from the corresponding magnet(s) 612. Magnets 612 are mounted onto a fixed component such as coil mount 614, which can be made of a ferromagnetic material such as steel to improve the efficiency of the magnet arrangement, as shown in FIGS. 5 a) to 5 e). Magnets 614 can alternately, as shown in FIG. 7, be mounted into ferromagnetic cells 702. The cells 702 are mounted into a fixed mount, which can be coil mount 614, made of a non-ferromagnetic material that could be aluminum. The gap differential causes a force/torque to be applied to the closer pivot arm 616, opposed in direction to the restoring torque of the flexure bearing 602, resulting in a smaller net restoring torque, making it easier for the actuator 634 that is comprised of sub-assemblies 606-608 to move/position mirror 618 as desired.

Note that the two magnets 612 could alternately be assembled close to the same pivot arm 616, in order for the magnets 612 to cancel each other's attraction at rest position. Such a design would improve the reliability of the flexure bearings 602 since the force summation comprising the attraction of the two magnet arrangements 612 would be restrained to one single component, pivot arm 616, which is assumed to be rigid. Consequently, no flexure bearing 602 would absorb the force of one magnet 612 and equaled by the other magnet 612. In contrast, the embodiment shown in FIG. 7 reduces the reliability and thus the lifetime of the flexure bearings 602 by causing the opposed forces of the magnets to be absorbed by the flexure bearings 602.

Figure 2:
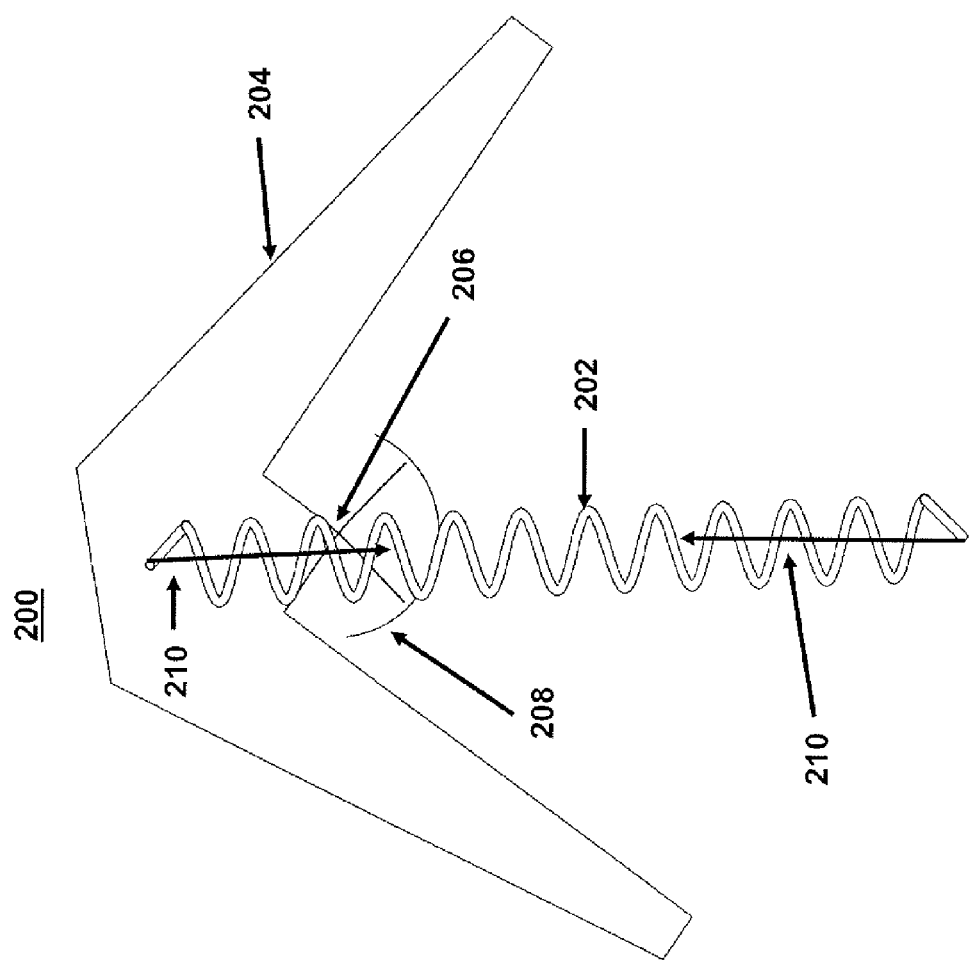
FIG. 2 shows a method of prior art flexure bearing torque compensation for an opto-mechanical scanning/positioning system.
Figure 3:
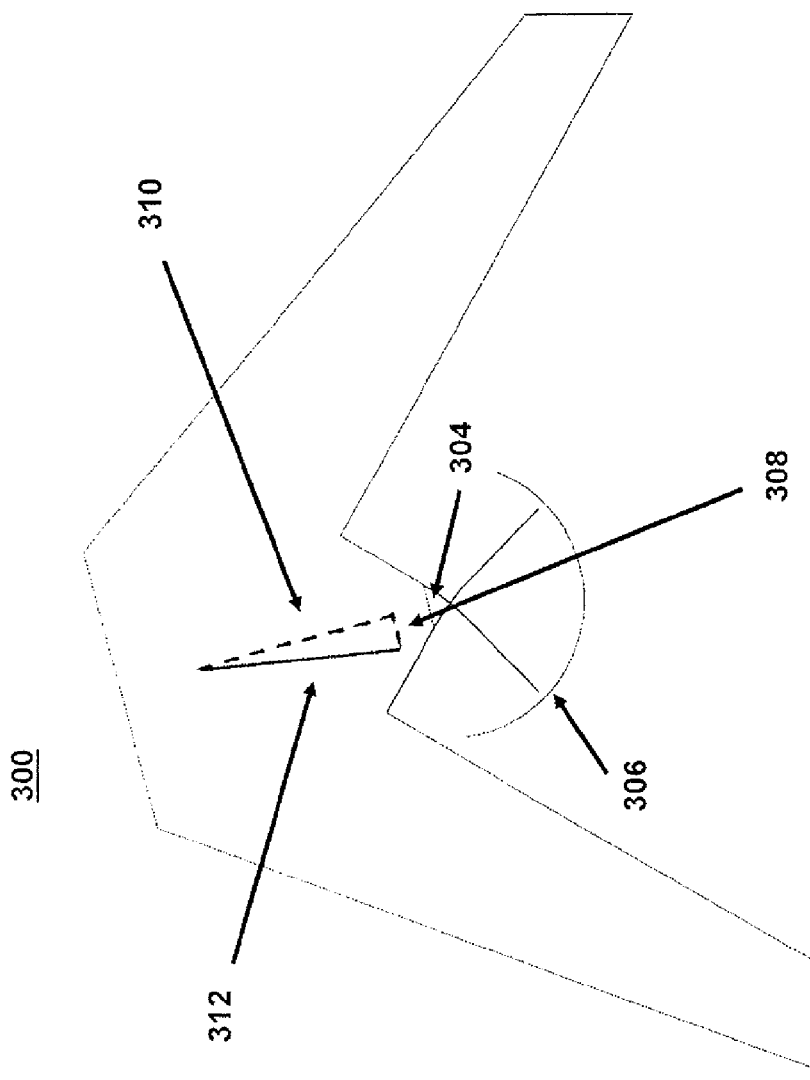
FIG. 3 shows the tangential component of the restoring torque compensation in compensation schemes shown in FIGS. 1 and 2.

The embodiment illustrated in FIG. 8 works differently than the embodiment shown in FIGS. 6 and 7. A single magnet or magnet arrangement 612 is mounted into a magnet holder 802 and positioned so that its attraction force with ferromagnetic carriage 610 is perpendicular to the stroke of the carriage. Instead of creating a gap differential to generate a force that compensates in one direction or the other, the magnetic compensation method shown in FIG. 8 creates and increases a temporary lever as carriage 610 and mirror 618 are actuated further on each side of the rest position. That temporary lever is coupled to a continuous force—the magnetic attraction of magnet 612—to provide a torque opposed in direction to that inherited from the flexure bearings 602, thus compensating for some portion of it. The force is further increased with the closing of the gap between carriage 610 and magnet 612 towards the two ends of the stroke. As is the case with the examples shown in FIGS. 1, 2 and 7, such an arrangement applies a continuous force onto the flexure bearings 602, reducing their reliability, hence their lifetime.

Figure 9A:
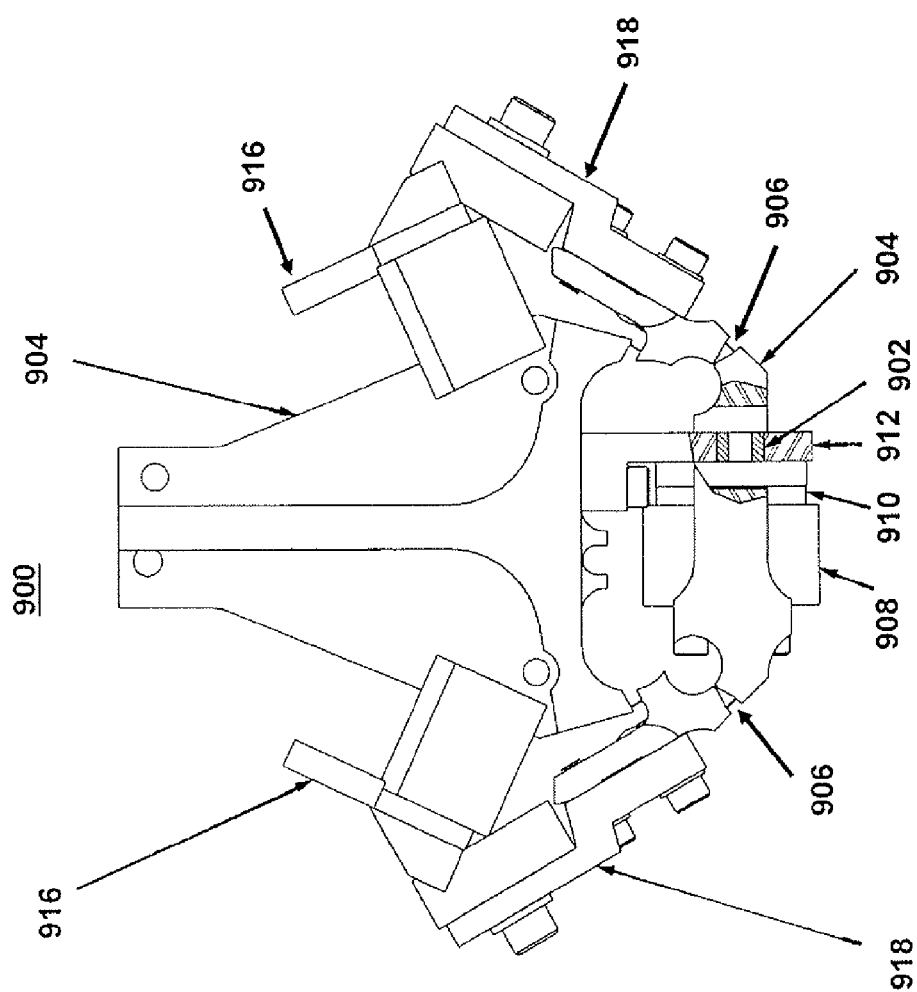
FIGS. 9a and 9b show respectively, a top view with partial section and a left side and rear perspective of a monolithic two beam interferometer at the rest position with the double pivot scanning mechanism that includes the flexure bearing restoring torque compensation of the present invention.
Figure 9B:
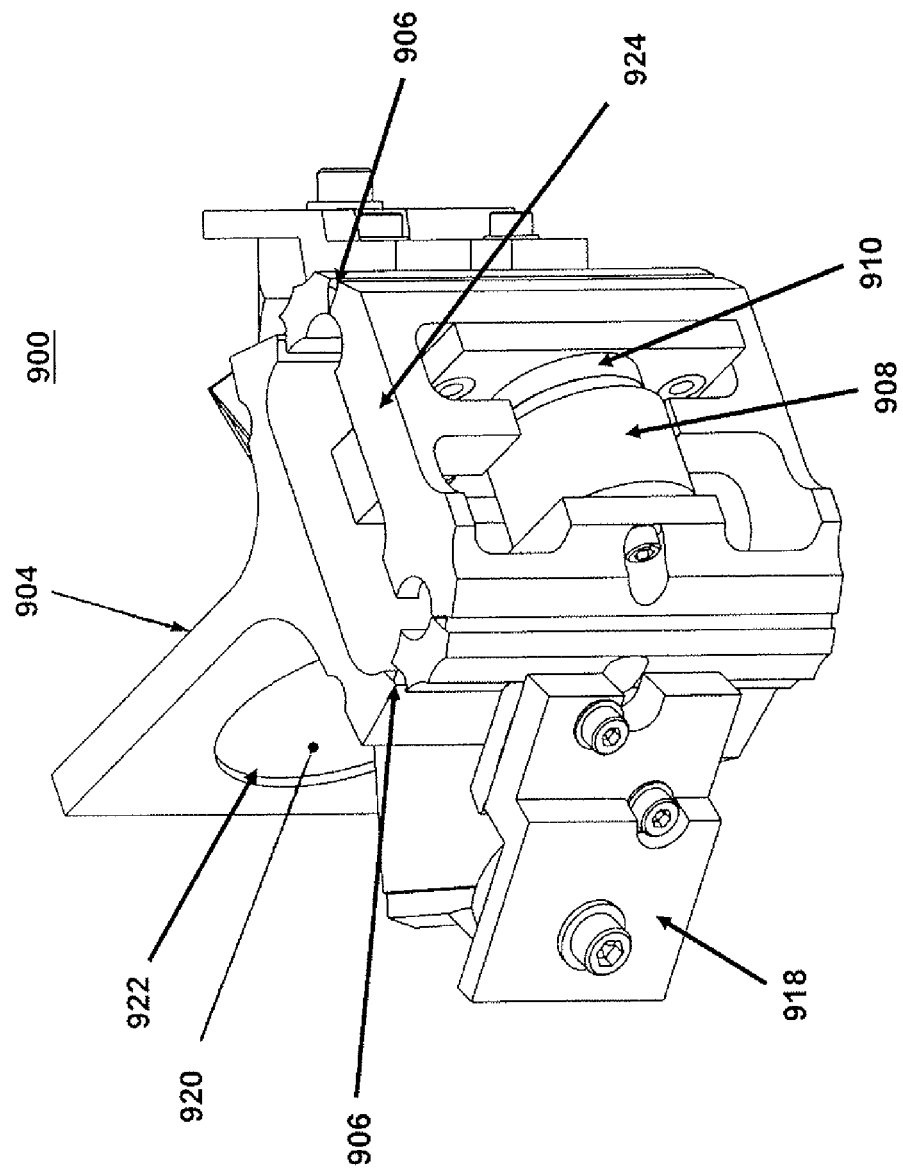

Referring now to FIGS. 9a and 9b, there is shown, respectively, a top view with partial section and a left side and rear perspective of a one piece or monolithic double pendulum type scanning Michelson two beam interferometer 900 at the rest position with the double pivot scanning mechanism described in U.S. patent application Ser. No. 11/652,778 filed on Jan. 12, 2007 ("the '778 Application") published as 20080170232 the disclosure of which is hereby incorporated herein by reference. Details about the construction of the monolithic two beam interferometer 900 and its advantages are given below.

The interferometer 900 has a first set of flexure bearings 906 that function as the rotation centers for an associated one of two pendulums. The interferometer 900 has a second set of flexure bearings 906 that function along with linkage 924 to link the two pendulums to each other.

Interferometer 900 includes in accordance with the present invention two permanent magnets 902 that are not described or shown in the '778 Application and thus has the flexure bearing restoring torque compensation of the present invention. As can be seen in FIGS. 9a and 9b, such an embodiment provides in the rest position equal gaps on each side of permanent magnets 902.

Interferometer 900 further comprises a ferromagnetic monolithic frame 904 that includes flexure bearings 906. Frame 904 functions as a scanning parallelogram. As shown in FIG. 9b, the magnet sub-assembly 908 of a linear voice coil actuator is attached to a portion of frame 904. The actuator, which also acts as a counterweight, also has a voice coil sub-assembly 910. While component 912, shown in FIG. 9a, serves as support for the coil sub-assembly 910 of the voice coil actuator, it also provides mounting holes for the two permanent magnets 902. Driven by voice coil actuator 908 and 910, two retroreflector mirrors 916 and their mounting plate 918 are rotated about their respective axis disposed on each side of beamsplitter 920 which is mounted in a hole in T shaped wall 922.

The monolithic double pivot interferometer 900 is built from one piece that includes the linkage 924, the flexure blades 906 and part of or the whole ferromagnetic monolithic frame 904, as well as part of or the whole pieces that constitute the pendulums. A monolithic double pivot interferometer 900 has significant advantages for manufacturing (less parts, faster assembling) as well as for the reproducibility of alignment of the flexure blades 906 from one interferometer to the other.

It should be appreciated that as with the embodiments shown in FIGS. 6a to 6c, the permanent magnets in the embodiments shown in FIGS. 7, 8, 9a and 9b that provide the attraction force to compensate for the flexure bearing restoring torque are separate from the magnet sub-assembly of the voice coil actuator.

It should further be appreciated that although the embodiments shown in FIGS. 6 to 9 incorporate a magnet or magnet arrangements that are fixed to the structure while the attracted ferromagnetic component is mobile, the reverse arrangement can also be used without deterioration in performance or reliability.

Referring now to FIG. 10, there is shown the relationship between magnet gap and attractive force in a magnetic circuit that comprises permanent magnet(s) and a ferromagnetic part.

The curve designated as A with the diamonds shows the force needed to maintain a gap varying from 0 to 3000 micrometers between a magnet and a ferromagnetic component. The trace designated as B with the squares is for a ferromagnetic component positioned between two permanent magnets with gaps on both sides. It shows the force needed to maintain a gap differential varying from 0 to 1500 micrometers, thus one of the two gaps varying from 0 to 3000, as identified by the x-axis of the graph.

Curve B shows that the two opposing gaps render the force versus gap distance substantially linear. Linearity is a great asset when it comes to the servo-control of a translational scanning mechanism such as the mechanisms 600 and 900 shown in FIGS. 6-9. As is well known, servo-control is a method used to maintain the position, velocity or acceleration of an actuated mechanism.

On the other hand, the one-gap configuration renders a non-linear force versus gap curve as is shown by curve A, which makes it not desirable where more accuracy is needed in position, velocity or acceleration.

As can be appreciated from the description of the embodiments shown in FIGS. 6-9 for the present invention, the magnet(s) that compensate for the flexure bearing are not the same as the magnet in the actuator subassembly and are located apart from that magnet. This difference allows the compensation mechanism to be flexible in its design, in the size of the restoring compensating magnets and allows the present invention to be used for restoring torque compensation in both optical translational and rotational scanning mechanisms.

The present invention is described above for a scanning mechanism, that is, a mechanism that sweeps back and forth continuously. The present invention may also be used with a pointing mechanism. The pointing mechanism rotates a mirror either to a specific position and locks the mirror in that position for a period of time or modifies the mirror's angular position continuously so that, for example, the mirror can track a moving target.

Figure 12A:
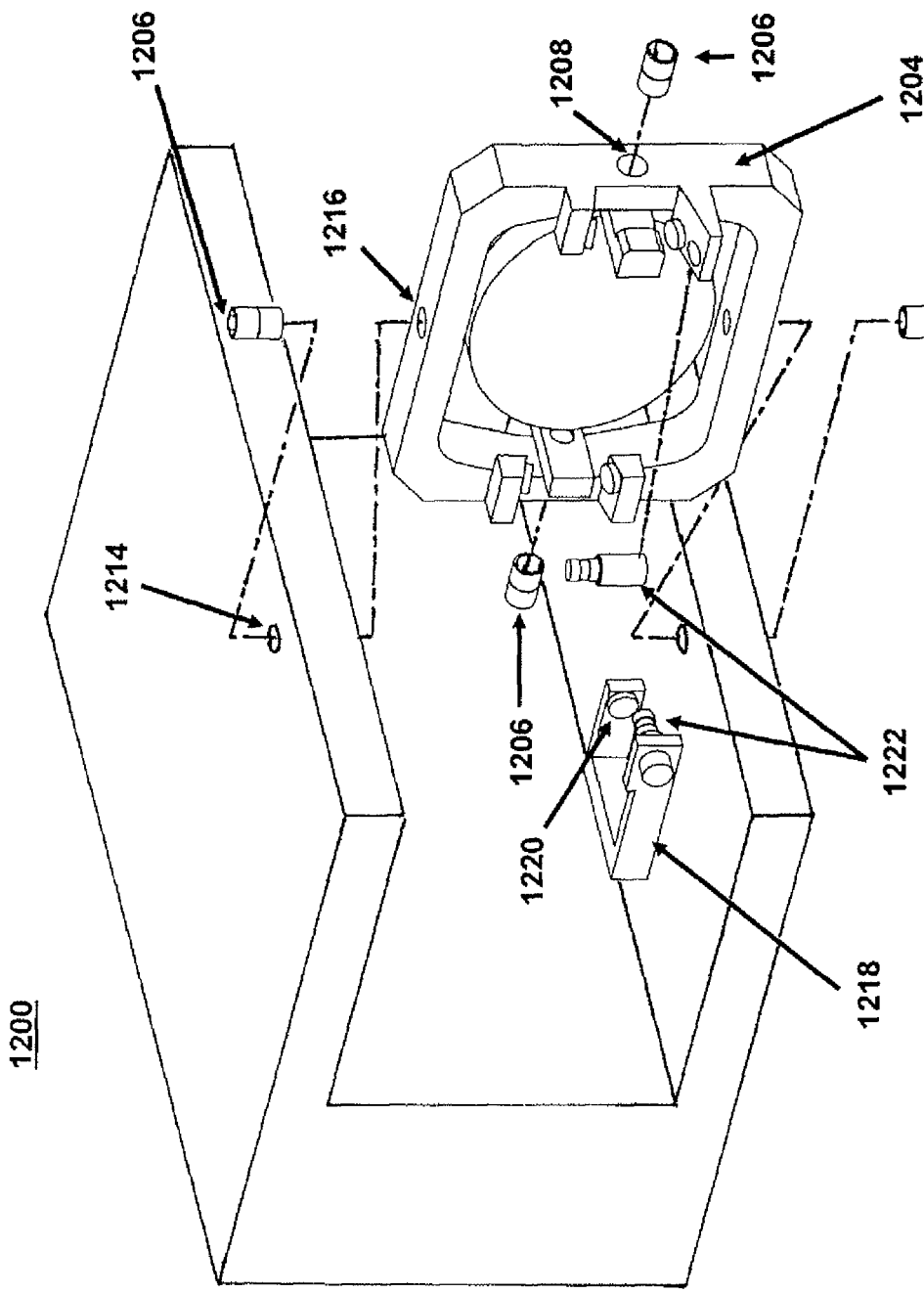
FIGS. 12a, 12b and 12c shows the present invention in one embodiment for an optical positioning mechanism.
Figure 12B:
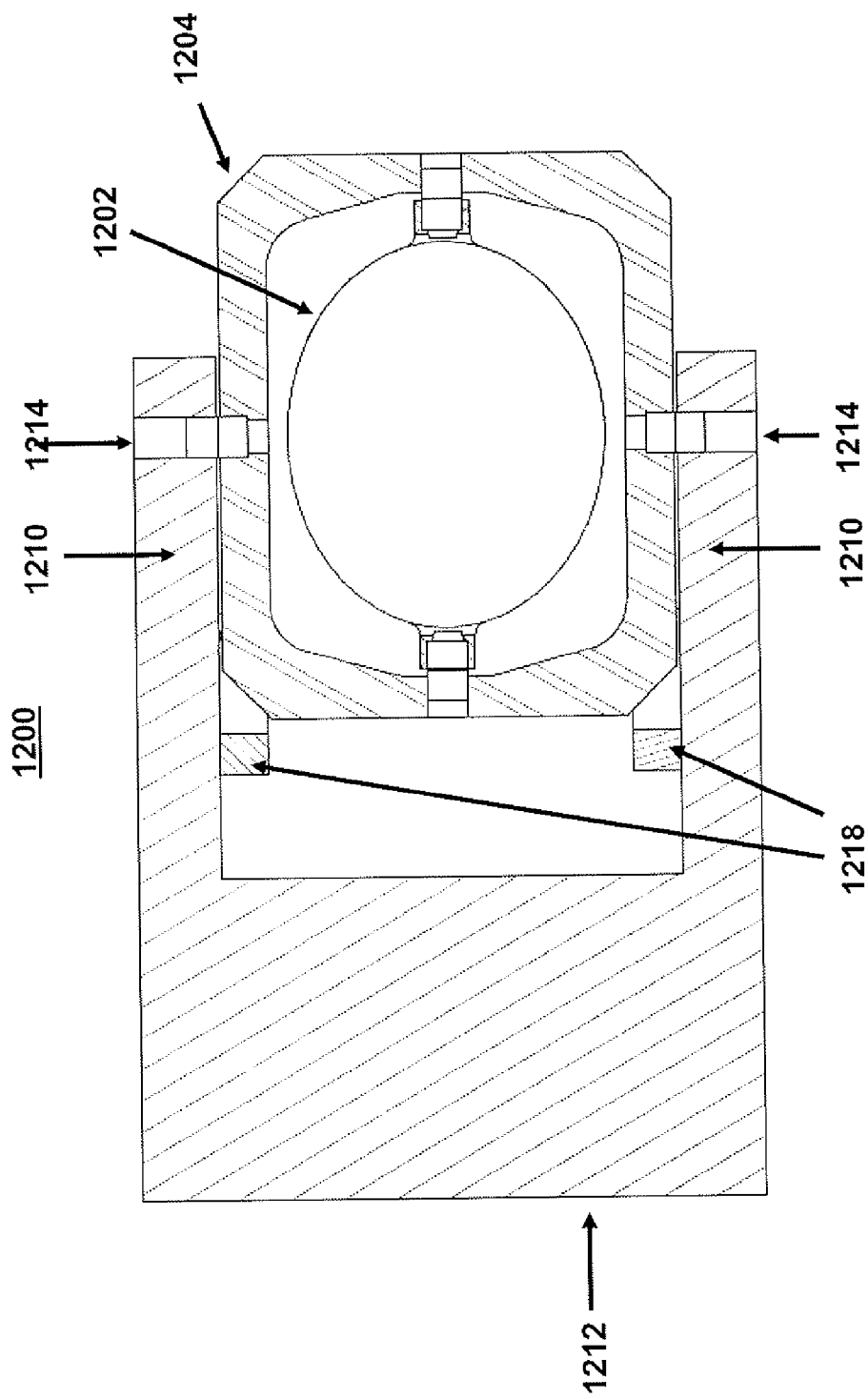
Figure 12C:
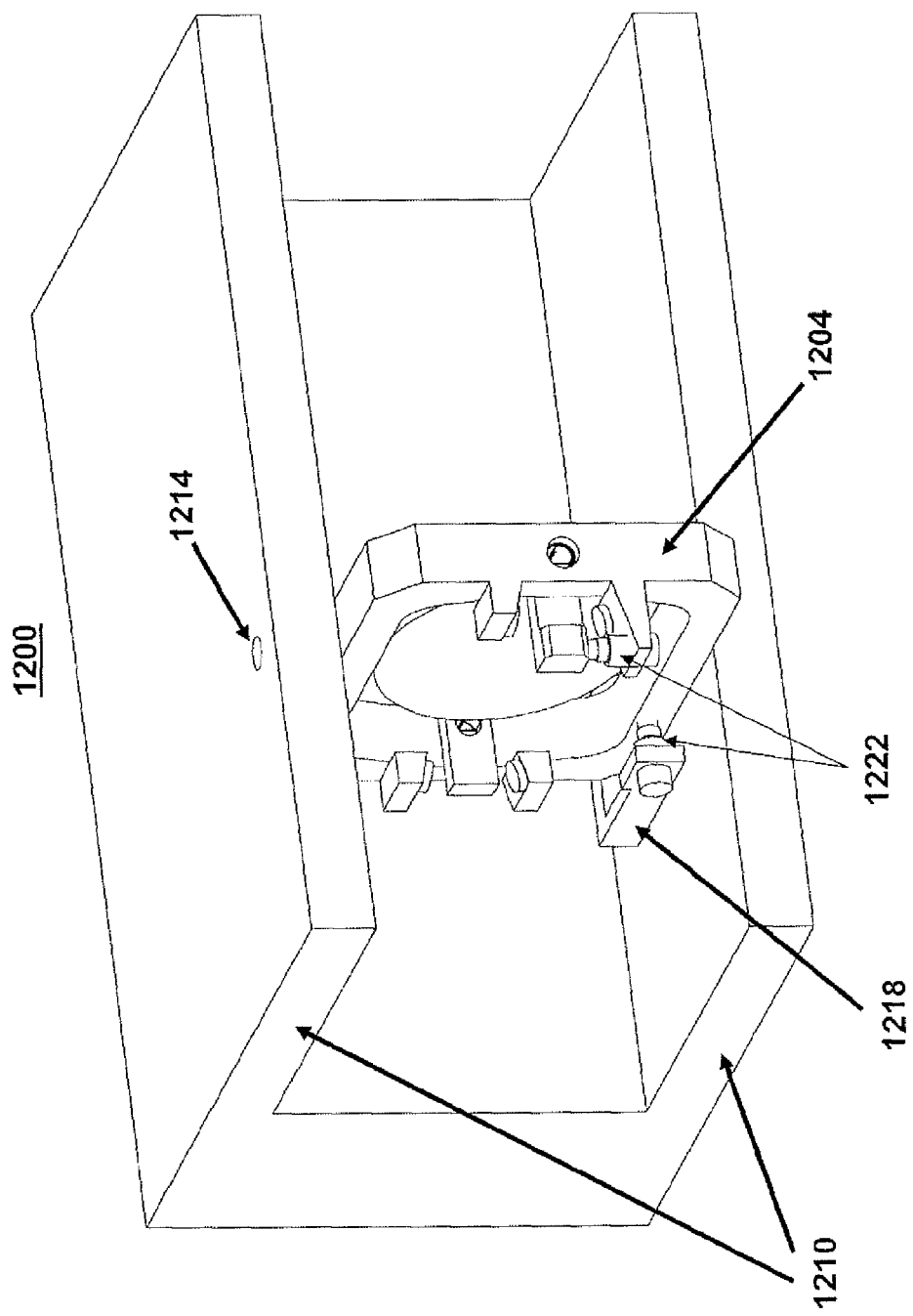

One embodiment for such a pointing mechanism that uses the present invention for compensating for the restoring torque of the flexure bearings used to mount the mirror is shown in FIGS. 12a, 12b and 12c. These figures illustrate a typical two-axis pointing mirror that has restoring torque compensation in accordance with the present invention around its two (2) axes. FIG. 12a is an exploded view of positioning mechanism 1200, FIG. 12b is a section view of positioning mechanism 1200 and FIG. 12c is a 3D view of positioning mechanism 1200.

As is shown in FIG. 12b, a gimbal ferromagnetic mirror 1202 is mounted in a gimbal ferromagnetic intermediate structure 1204 with two flexure bearings 1206 that are shown in FIG. 12a. As is shown in FIG. 12a, the vertical sides of the intermediate structure 1204 each have a hole 1208 for receiving an associated one of the two flexure bearings 1206.

As is shown in FIGS. 12b and 12c, the combination of the mirror 1202 and intermediate structure 1204 are mounted in the arms 1210 of a U-shaped gimbal structure 1212. Each arm 1210 has a hole 1214 for, as is shown in FIG. 12a, receiving an associated one of two flexure bearings 1206 when the combination of the mirror 1202 and intermediate structure 1204 are mounted in the U-shaped structure 1212. As shown in FIG. 12a, the horizontal sides of the intermediate structure 1204 each have a hole for receiving, as is shown in FIG. 12b, the associated one of the two flexure bearings 1206 when the mirror and intermediate structure combination is mounted in structure 1212.

As is shown in FIGS. 12a, 12b and 12c, the interior of each arm 1210 of structure 1212 has mounted thereon a U-shaped magnet support 1218. As is shown in FIG. 12a, a permanent magnet 1220 is mounted on the interior surface of each arm of magnet support 1218. As is shown in FIG. 12c, the combination of mirror 1202 and ferromagnetic intermediate structure 1204 are inside of the space between the pair of arms of the upper and lower U-shaped magnet supports 1218 when the combination is assembled with structure 1212. Thus the permanent magnets 1220 compensate for the restoring torque of the vertical axis.

Other permanent magnets 1220 are mounted on intermediate structure 1204 as shown in FIG. 12a and also in FIG. 12c so that these magnets are on each side of the ferromagnetic gimbal mirror 1202 when the mirror is assembled with intermediate structure 1204. These magnets compensate for the restoring torque of the horizontal axis.

Also shown in FIGS. 12a and 12c are two actuators 1222 for moving the positioning mechanism around two rotation axes. The actuators 1222 could be piezoelectric actuators that allow high-precision control of the positioning.

There have been shown herein various embodiments for scanning mechanisms and a pointing mechanism that use magnets to compensate for the restoring torque of the flexure bearings in those mechanisms. The flexure bearings used in each of those embodiments are available from Riverhawk Company of New Hartford, N.Y.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An optical scanning or positioning mechanism comprising:
    a head having optical components mounted thereon;
    an actuator coupled to said head to cause said head to move when said actuator is actuated;
    one or more sets of flexure bearings mounted in said mechanism and coupled to said head to allow said head when actuated by said actuator to move, said one or more sets of flexure bearings each having a restoring torque when moved from a rest position by said head movement; and
    one or more permanent magnets mounted in said mechanism in a location other than in said actuator to compensate for said flexure bearings restoring torque.

2. The optical mechanism of claim 1 wherein said optical mechanism is a scanning mechanism and said actuator is a linear voice coil actuator.

3. The optical mechanism of claim 2 wherein said one or more flexure bearings are four sets of flexure bearings.

4. The optical mechanism of claim 3 further comprising a linkage that is connected at opposite ends to an associated one of two of said four sets of flexure bearings and said voice coil actuator comprises a magnetic assembly.

5. The optical mechanism of claim 2 wherein said optical components is a mirror assembly mounted on said head.

6. In an optical scanning or positioning mechanism having a head with optical components mounted thereon, an actuator coupled to said head to cause said head to move when said actuator is actuated, one or more sets of flexure bearings mounted in said mechanism and coupled to said head to allow said head when actuated by said actuator to move, said one or more sets of flexure bearings having a restoring torque when moved from a rest position by said head movement, a method for providing compensation for said restoring torque of said one or more flexure bearings comprising:

mounting one or more permanent magnets in said mechanism in a location other than in said actuator to compensate for said flexure bearings restoring torque.

7. A method for making an optical scanning or positioning mechanism having a head having optical components mounted thereon comprising:

coupling an actuator to said head to cause said head to move when said actuator is actuated;

providing one or more sets of flexure bearings mounted in said mechanism and coupled to said head to allow said head when actuated by said actuator to move, said one or more sets of flexure bearings having a restoring torque when moved from a rest position by said head movement; and mounting one or more permanent magnets in said mechanism in a location other than in said actuator to compensate for said flexure bearings restoring torque.

8. In an optical scanning or positioning mechanism having a head with optical components mounted thereon, an actuator coupled to said head to cause said head to move when said actuator is actuated, one or more sets of flexure bearings mounted in said mechanism and coupled to said head to allow said head when actuated by said actuator to move, said one or more sets of flexure bearings having a restoring torque when moved from a rest position by said head movement, a method for compensating for said restoring torque of said one or more flexure bearings comprising:

using the magnetic field of one or more permanent magnets mounted in said mechanism in a location other than in said actuator to provide a force to compensate for said restoring torque of said one or more flexure bearings.

* * * * *